United States Patent Office 2,793,121
Patented May 21, 1957

2,793,121

BAKING POWDER

Peter Novitsky, Chicago, Ill., assignor to General Foods Corporation, White Plains, N. Y., a corporation of Delaware No Drawing. Application June 9, 1954,
Serial No. 435,608

11 Claims. (Cl. 99—95)

This invention relates to improved baking powder compositions.

Baking powders have long been used in the baking of biscuits, cakes, and various oven goods to impart to them an open or leavened texture. They generally contain a water soluble bicarbonate, one or more acid reacting ingredients, and an inert filler, such as starch, calcium carbonate, or flour. In the presence of water at room temperature, the acid reacting ingredients and the bicarbonate react to provide some of the available carbon dioxide. This is the condition obtained in the batter stage of preparing baked goods. During subsequent baking of the batter, additional carbon dioxide is evolved from the baking powder composition. The heat of baking not only accelerates the evolution of carbon dioxide, but also causes the gas bubbles which have been entrapped in the batter to expand. Thereafter the batter is set in the well-known manner.

Various materials, such as monocalcium phosphate, sodium aluminum sulfate, potassium acid tartrate, disodium dihydrogen pyrophosphate, and calcium lactate, have been employed as the acid ingredients of conventional baking powders. Of these, sodium aluminum sulfate and/or monocalcium phosphate are most frequently used. These two materials, designated hereinafter as SAS and MCP for convenience, are used independently or combined in various proportions depending on the speed of reaction desired. Commercial SAS reacts to a relatively small extent with the bicarbonate in the batter stage, the major part of the reaction occurring during baking. MCP, on the other hand, is "faster acting" and reacts to a major extent in the batter stage, leaving the lesser amount of reaction to occur in the course of baking. A combination baking powder which employs both SAS and MCP is called a "double acting" baking powder because of its ability to liberate a certain amount of the available carbon dioxide in the batter stage while also releasing a substantial amount thereafter in the baking stage.

It is readily apparent that the most perfect baking powder is one which provides the optimum amount of gas at the optimum rate at each stage in the preparation of the baked goods. In the past, many attempts have been made to alter the amounts of gas evolved in the various stages of preparing baked goods as well as to alter the rate at which the gas is evolved. The principal problem, however, concerns the amount of gas liberated in the baking stage. Although SAS provides a greater amount of carbon dioxide in the baking stage, its use is limited. Too great an amount of SAS imparts an off-flavor to the baked goods containing it. The deficiency of carbon dioxide evolution in the baking stage cannot be corrected by using more of a faster acting acid ingredient such as MCP because the amount of gas evolved in the batter stage will result in overleavening.

The limitations involved in formulating a baking powder result from the well established standards for its use, as well as its functional requirements. All standard recipes calling for the use of baking powder specify a teaspoon or a fraction thereof as the unit of measure. Consequently, a standard has been developed which is adhered to by most of the manufacturers of baking powder in the United States. A standard "level teaspoon" comprises about 4.93 cc. and this amount of baking powder must be capable of providing from about 0.50 to about 0.63 g. of carbon dioxide. Since the measurements made by commercial bakers are frequently carried out on a weight basis, a combination baking powder must also be capable of delivering from about 12% to about 25% by weight of carbon dioxide. If the above limitations are not followed, the baked goods will either be overleavened or underleavened. The total available carbon dioxide is, of course, governed by the amount of bicarbonate which is present per unit measure, as well as the amount and efficiency of the acid reacting ingredients which are present.

In addition to the above limitations, a baking powder to be sold in normal retail channels must remain stable for a considerable length of time. This period includes the time required for commercial distribution and sale, as well as the time required for use in the home. The stability problem with baking powder is due to moisture absorption causing the carbon dioxide evolution to occur prematurely. The desired stability and the required volume and weight standards are presently achieved by the use of a cornstarch filler. It provides the necessary bulk to the product. Also, it physically spaces the acid reacting ingredients from the bicarbonate and has the important property of preferentially absorbing moisture which may contact the baking powder.

Cornstarch is not entirely satisfactory, however, because of its high cost. The baking powder industry, therefore, has long sought a replacement for it. Calcium carbonate has been used but it fails to provide any worthwhile stabilization. Flour is also unacceptable because it becomes rancid. Other fillers fail for one reason or another. As a result, substantially all baking powders are prepared with cornstarch. In commercial bakeries, however, the required period of stability is less and other fillers may be used.

It is an object of this invention to provide a baking powder which results in improved baked goods.

Another object is to provide a baking powder which substantially increases the ratio of carbon dioxide evolved in the baking stage to that evolved in the batter stage.

Another object is to provide a baking powder as described which is capable of delivering the required amount of carbon dioxide per unit volume.

Another object is to provide a baking powder with a reduced amount of cornstarch but no loss in stability.

These and other objects will become apparent from the following detailed description.

It has now been discovered that a mixture of an alkali-metal bicarbonate, calcium sulfate, sodium aluminum sulfate, and monocalcium phosphate provides a baking powder having the above-described characteristics.

The use of calcium sulfate in baking powders has been proposed heretofore. For example, H. E. Patten has suggested in the Journal of the Association of Official Agricultural Chemists, 2, #4, 225–9 (1917) that calcium sulfate be employed with MCP. Such a combination, however, does not provide the improved product of the present invention. The use of calcium sulfate with MCP results in the greater amount of carbon dioxide evolution taking place in the batter stage while the addition of calcium sulfate to a baking powder employing both MCP and SAS substantially increases the amount of carbon dioxide released in the baking stage.

In order to demonstrate the above, the amount of carbon dioxide evolved on their being used was measured for the following three types of baking powder:

| Parts by weight of— | A | B | C |
|---|---|---|---|
| MCP | 22.6 | 15.0 | 8.7 |
| SAS | 0 | 20.0 | 20.0 |
| CaSO$_4$ | 35.6 | 0 | 14.2 |
| NaHCO$_3$ | 30.0 | 30.0 | 30.0 |
| Cornstarch | 11.8 | 35.0 | 17.1 |

The same weight of baking powder was used in each case and evolution during batter and baking stage was determined. The results of the test are tabulated below:

| Baking Powder | Percent of CO$_2$ evolved in Batter | Percent of CO$_2$ evolved during Baking | Percent of dry ingredients as evolved CO$_2$ |
|---|---|---|---|
| A | 50.0 | 50.0 | 14.8 |
| B | 41.0 | 59.0 | 14.8 |
| C | 29.0 | 71.0 | 14.8 |

Baking powder A represents the most favorable application of calcium sulfate in accordance with the knowledge of the industry prior to the present invention. Baking powder B represents the most widely used household baking powder and achieves a higher amount of gas evolution in the baking stage by employing SAS. Baking powder C is representative of the present invention. The data show substantial improvement of C over either A or B, even though C employs the same amount of SAS as B and would therefore be expected to provide the same carbon dioxide evolution during baking. In addition, formula C employs less MCP than either A or B. This represents a further advantage of using calcium sulfate.

The improved gas evolution characteristics of the baking powders of the present invention explains in part the improved baked goods resulting from its use. In standard biscuit baking tests using the same amount of baking powder, baking powder A provided biscuits having a volume of about 90% of the biscuits resulting from baking powder C. The biscuits resulting from the use of baking powder B were about 95% of the volume of the biscuits resulting from the use of baking powder C.

When used in standard cake recipes, the baking powder of the present invention not only provides increased cake volumes, but also an improved texture. In a representative experiment, 30 white cakes were prepared in three groups of 10 each. The method employed and the ingredients used were the same for all of the cakes with the exception of the baking powder. Baking powder A was used for one group, while baking powder B and baking powder C were used in the other two groups. While the average volume of those cakes employing baking powder C was only about 2½% greater than the average volume of those cakes employing baking powder B, it was 20% greater than the average volume of those cakes prepared with baking powder A.

In order to rate the above cakes in regard to overall quality and texture, expert opinions were obtained. The expert testers examine and taste numerous cakes daily and have studied the results of numerous consumer tests. Their opinions are not based on personal preference, but on trained observations. The above cakes were presented to ten such experts who were not given any advance information in regard to the purpose of the test. These experts selected as their first preference those cakes prepared with baking powder C and as their second preference those baked with baking powder B. Those prepared with baking powder A were least preferred. In regard to overall grade and quality, the cakes prepared with baking powder C received almost twice as many "excellent" votes as did the cakes baked with baking powder A and 1½ times as many as the cakes prepared with baking powder B.

To obtain optimum results in regard to the improved leavening provided by the present invention, a ratio of calcium sulfate to MCP equivalent to about 1.16 g. of anhydrous calcium sulfate per gram of anhydrous MCP should be used. In the case of the commercial MCP presently employed in baking powders which is a monohydrate and contains considerable insoluble matter this ratio is 1.02 g. calcium sulfate per gram MCP. A lower ratio of calcium sulfate to MCP provides improved leavening but not to the full extent available by means of the present invention, while a higher ratio results in little additional improvement in leavening. However, such a higher ratio is generally employed since this permits a greater displacement of the more expensive starch. The ratio generally preferred is about 1.6 g. of calcium sulfate per gram of MCP. When larger amounts of calcium sulfate are employed the amount of MCP is usually increased to maintain this ratio of 1.6:1 and smaller amounts of SAS and/or starch are employed by way of compensation. The reduction in starch, however, should not be such as to reduce it to below about 16% of the baking powder composition otherwise there is a serious loss in stability on storage. Previous to the present invention the amount of cornstarch usually employed in a baking powder composition was of the order of 35%. Similarly, the amount of calcium sulfate should not exceed 30% of the baking powder composition. The amount of SAS that may be employed can be varied independently of the amounts of calcium sulfate and MCP but, generally, with larger amounts of the latter two materials smaller amounts of SAS are employed.

Calcium sulfate occurs as the anhydrite, the hemihydrate and the dihydrate. Of these the anhydrite is by far the most preferred since it provides for a baking powder composition of maximum stability on storage. The other forms of calcium sulfate are somewhat equally reactive and will function as acid ingredients in the baking powder composition but do not provide to the same high degree as the anhydrite the advantage with regard to stability.

The compounding and mixing steps are generally very cricital points in the preparation of baking powders. The amounts of individual ingredients must be very carefully measured and mixing must be uniform and thorough to insure a baking powder of uniform available carbon dioxide content. The same precautions of course apply to the baking powders of the present invention. The desired amount of calcium sulfate is added to the mixture together with the carefully measured, calculated amounts of the other ingredients and the mixing is carried out in the usual manner. All of the other ingredients are of the customary high purity and quality. Sodium and potassium bicarbonate are the only carbonates used in commercial baking powders, although other alkali metal bicarbonates such as those of cesium, rubidium, lithium, and the like, react with the usual acid ingredients to provide carbon dioxide. The amount of bicarbonate which is present, of course, governs the amount of total available carbon dioxide if provision has been made for complete or nearly complete reaction. Calcium sulfate anhydrite is, of course, anhydrous.

In addition to baking powder C discussed above, other formulations employing calcium sulfate in accordance with the present invention are set forth below:

|  | NaHCO$_3$ | SAS | MCP | CaSO$_4$ | Starch |
|---|---|---|---|---|---|
| D | 30 | 17.5 | 10.5 | 17.1 | 24.9 |
| E | 30 | 15 | 11.9 | 19.2 | 23.9 |
| F | 30 | 10 | 15 | 24.1 | 20.9 |
| G | 30 | 5 | 18.3 | 29.1 | 17.6 |

Under highly adverse conditions of humidity and temperature baking powder D has a shelf life of about 12 months, while baking powder E has one of 11 months, baking powder F has one of 8 months and baking powder G has one of 7 months. While a shelf life of 7 or 8 months is too short for distribution in normal retail channels, baking powders F and G are entirely suitable for distribution to the commercial trade such as bakers. In such a case long shelf life is not necessary and the less expensive product is entirely suitable. Baking powders F and G provide biscuits and cakes of a quality equal to those prepared with baking powder B while permitting considerable reduction in the amount of cornstarch employed. Baking powders D and E provide biscuits and cakes of a quality better than that provided by the use of baking powder B and similar to those provided by the use of baking powder C.

It will be understood that while the invention has been described in part by means of specific examples reference should be had to the appended claims for a definition of the scope of the invention.

What is claimed is:

1. In a baking powder composition comprising sodium aluminum sulfate, monocalcium phosphate and an alkali metal bicarbonate, the improvement which comprises providing for the presence of calcium sulfate in intimate admixture with the other ingredients of the baking powder composition.

2. The baking powder composition of claim 1 wherein the calcium sulfate is present in the amount of at least 1.16 g. per gram of monocalcium phosphate.

3. In a baking powder composition comprising sodium aluminum sulfate, monocalcium phosphate, an alkali metal bicarbonate and cornstarch, the improvement which comprises providing for the presence of calcium sulfate in intimate admixture with the other ingredients of the baking powder composition.

4. The baking powder composition of claim 3 wherein the calcium sulfate is present in the amount of at least 1.6 g. per gram of monocalcium phosphate.

5. The baking powder composition of claim 3 wherein the calcium sulfate is present in the form of the anhydrite.

6. The baking powder composition of claim 3 wherein the amount of cornstarch in the composition is in excess of about 16% and the amount of calcium sulfate present in the composition is less than about 30%.

7. A baking powder composition comprising about 30% sodium bicarbonate, about 20% SAS, about 8.7% MCP, about 14.2% anhydrous calcium sulfate and about 27.1% cornstarch.

8. A baking powder composition comprising about 30% sodium bicarbonate, about 17.5% SAS, about 10.5% MCP, about 17.1% anhydrous calcium sulfate and about 24.9% cornstarch.

9. A baking powder composition comprising about 30% sodium bicarbonate, about 15% SAS, about 11.9% MCP, about 19.2% anhydrous calcium sulfate and about 23.9% cornstarch.

10. A baking powder composition comprising about 30% sodium bicarbonate, about 10% SAS, about 15% MCP, about 24.1% anhydrous calcium sulfate and about 20.9% cornstarch.

11. A baking powder composition comprising about 30% sodium bicarbonate, about 5% SAS, about 18.3% MCP, about 29.1% anhydrous calcium sulfate and about 17.6% cornstarch.

References Cited in the file of this patent

UNITED STATES PATENTS 2,000,160    Broeg ------------------ May 7, 1935
2,131,433    Fiske ------------------ Sept. 27, 1938

OTHER REFERENCES

Journal of The Association of Official Agricultural Chemists, 2, #4, 225–9 (1917).